US012548413B2

(12) United States Patent
Verstraeten

(10) Patent No.: US 12,548,413 B2
(45) Date of Patent: Feb. 10, 2026

(54) AMUSEMENT MACHINE OF THE PUSHER TYPE

(71) Applicant: Elaut N.V., Sint-Niklaas (BE)

(72) Inventor: Eric Verstraeten, Sint-Niklaas (BE)

(73) Assignee: Elaut N.V., Sint-Niklaas (BE)

( * ) Notice: Subject to any disclaimer, the term of this patent is extended or adjusted under 35 U.S.C. 154(b) by 826 days.

(21) Appl. No.: 17/849,280

(22) Filed: Jun. 24, 2022

(65) Prior Publication Data

US 2023/0377425 A1 Nov. 23, 2023

(30) Foreign Application Priority Data

May 23, 2022 (NL) ..................................... 2031960

(51) Int. Cl.
*A63F 9/00* (2006.01)
*G07F 17/32* (2006.01)

(52) U.S. Cl.
CPC ............ *G07F 17/3297* (2013.01); *A63F 9/00* (2013.01); *A63F 2250/136* (2013.01)

(58) Field of Classification Search
None
See application file for complete search history.

(56) References Cited

U.S. PATENT DOCUMENTS 5,611,534 A 3/1997 Takemoto et al.
8,302,966 B1 * 11/2012 Sullivan ............. G07F 17/3297 273/138.2
2009/0033032 A1 * 2/2009 Niwa .................. G07F 17/3297 273/138.3
2012/0049446 A1 * 3/2012 Lai ...................... G07F 17/3202 273/138.1
2012/0061911 A1 * 3/2012 Horii ....................... G07F 17/32 273/109
2013/0069303 A1 * 3/2013 Hasegawa ........... G07F 17/3213 273/138.1
2013/0084934 A1 * 4/2013 Young ................. G07F 17/3293 463/16
2013/0337901 A1 * 12/2013 Saruta ..................... A63F 13/10 463/25

(Continued)

FOREIGN PATENT DOCUMENTS

EP 0755033 A1 1/1997
EP 3021298 A1 5/2016
WO 9321495 A1 10/1993

*Primary Examiner* — Paul A D'Agostino
(74) *Attorney, Agent, or Firm* — The Webb Law Firm

(57) ABSTRACT

Provided is an amusement machine of the pusher type, including a playing surface on which playing pieces, as well as one or more prizes are supported, a playing piece pusher configured to move over the playing surface in order to disturb the playing pieces and one or more prizes supported on the playing surface; a transport system configured to transport a prize which has dropped over an edge; a first detection module configured to detect a prize which has dropped over the edge, at a first location, a second detection module configured to detect the prize at a second location; and a control unit configured to receive a first detection result from the first detection module and a second detection result from the second detection module, and to control the amusement machine in function of the first and/or second detection result.

18 Claims, 11 Drawing Sheets

(56) References Cited

U.S. PATENT DOCUMENTS

| | | | | |
|---|---|---|---|---|
| 2014/0235356 | A1* | 8/2014 | Yamane | G07F 17/3276 463/42 |
| 2016/0140811 | A1* | 5/2016 | Verstraeten | G07F 17/38 273/454 |
| 2019/0206195 | A1* | 7/2019 | Kido | G07F 17/3213 |
| 2019/0213825 | A1* | 7/2019 | Shoemaker, Jr. | G07F 11/165 |
| 2020/0058196 | A1* | 2/2020 | Nelson | G07F 17/3204 |

* cited by examiner

AMUSEMENT MACHINE OF THE PUSHER TYPE

CROSS-REFERENCE TO RELATED APPLICATION

This application claims priority to The Netherlands Patent Application No. 2031960 filed May 23, 2022, the disclosure of which is hereby incorporated by reference in its entirety.

BACKGROUND OF THE INVENTION

Field of the Invention

The present invention relates to an amusement machine of the pusher type in which a plurality of playing pieces such as coins, chips or marbles are used for gameplay, as well as one or more prizes.

Description of Related Art

Amusement machines of the pusher type have existed for years and can be subdivided into traditional pushers, in which playing pieces in the form of coins, tokens or chips are paid out to a player, and more recent variants in which the coins or chips circulate in a closed loop in the machine and reintroduced into the game by means of hoppers. Such an amusement machine is for instance described in EP 0 755 033.

In addition, it is known to add prizes to the playing pieces in order to make the game more exciting. These prizes can be added as prize tokens having the same shape as the playing pieces. According to another variant, the prizes have a different shape. The prizes may be paid out to a player by a separate dispensing module, in which case an operator then has to regularly add new prizes to the machine. In an improved amusement machine the prizes are circulated in a closed loop in the machine. Such an embodiment is disclosed in European patent application EP 3 021 298 A1 in the name of the applicant which is included herein by reference.

SUMMARY OF THE INVENTION

According to a first aspect of the invention, an amusement machine of the pusher type is provided. The amusement machine comprises a playing surface, a playing piece pusher, a transport system, a first and second detection module and a control unit. The playing surface supports a plurality of playing pieces, such as coins, chips or marbles, as well as one or more prizes. The playing piece pusher is configured to move over the playing surface at successive points in time in order to disturb the plurality of playing pieces and one or more prizes supported on the playing surface, and such that one or more playing pieces and/or prizes can drop over an edge of the playing surface during movement of the playing piece pusher. The transport system is configured to transport a prize which has dropped over an edge. The first detection module is configured to detect a prize which has dropped over the edge, at a first location in the transport system, and the second detection module is configured to detect the prize at a second location in the transport system, said second location being different from the first location. The control unit is configured to receive a first detection result from the first detection module and a second detection result from the second detection module, and to control the amusement machine in function of the first and/or second detection result.

By having a first and a second detection module, the prize can be detected and followed within the amusement machine in an improved manner More in particular, it can be ascertained that a prize is not lost or blocked somewhere in the amusement machine.

Preferably, the control unit is configured to generate an alarm message when a first detection result by the first detection module indicates the detection of a prize and a second detection result by the second detection module does not indicate the detection of the same prize within a predetermined time from the first detection result. Such an alarm message gives an indication that a prize may be lost between the first location where it was detected and the second location where it was not detected. Similarly, the control unit may be configured to generate an alarm message when only a second detection result by the second detection module indicates the detection of a prize and this prize was not previously detected by the first detection module. This may indicate a malfunctioning of the first detection module or another problem.

Preferably, the control unit comprises an award module configured for awarding a number of prize points to the player if the control unit has received a first detection result indicating the detection of a prize and a second detection result indicating the detection of the same prize. These prize points can optionally be shown on a display screen of the machine. These prize points can for instance be paid out to a player by means of a ticket dispensing module which prints a ticket stating the number of prize points. If use is made of different types of prizes associated with different points, the detection module is preferably then configured to detect the type of prize so that the corresponding number of points can be calculated therefrom.

Preferably, the transport system comprises: a prize collecting location configured to collect at least one or more prizes which have dropped over the edge, a prize infeed location configured for infeed of one or more prizes on the playing surface, and a prize transport mechanism, preferably comprising at least one of a lift module and an Archimedes screw, configured to transport one or more prizes collected in the prize collecting location to the prize infeed location.

In an exemplary embodiment, the first detection module is arranged to detect a prize between the edge of the playing surface and the prize collecting location or at the prize collecting location, and the second detection module is arranged to detect a prize between the prize infeed location and the playing surface. In this way it can be ascertained that a prize is re-introduced on the playing surface.

In an exemplary embodiment, the first detection module is arranged to detect a prize at a first location between the edge of the playing surface and the prize collecting location and the second detection module is arranged to detect a prize at a second location downstream of the first location. For example, the second detection module may be arranged to detect a prize between the edge of the playing surface and the prize collecting location or at the prize collecting location. Also, the second detection module may be located in the prize transport mechanism.

It is noted that also more than two detection modules may be provided at any one of the above specified locations.

In the context of the present application, the control unit may be a central control unit or a distributed control unit comprising sub-control units located at different locations of the amusement machine.

In a possible embodiment, the prize collecting means is configured to collect one or more prizes and one or more playing pieces which have dropped over the edge.

In another exemplary embodiment, the amusement machine further comprises a sorting and discharge mechanism configured for sorting and discharging one or more prizes and playing pieces which have dropped over the edge to the prize collecting location and a playing piece collecting location, respectively. In such an embodiment, the first detection module may be configured to detect a prize in a prize discharge channel between the sorting and discharge mechanism and the prize collecting location.

The prize discharge channel can for instance comprise an inclining surface and/or a conveyor belt. A controllable barrier means can further be provided in the discharge channel for temporarily holding back the one or more playing pieces and/or prizes, for instance because an associated lift module is not yet in the correct position.

Preferably, the control unit is configured for controlling the transport system in function of first and/or second detection results of the first and/or second detection module, and in particular in function of a number of prizes detected by the first and/or second detection module, optionally further in function of a player input.

In an exemplary embodiment, a guide is provided between the prize infeed location and the playing surface, which guide is configured to guide the one or more prizes from the prize infeed location to the playing surface, wherein preferably the guide is an inclining surface, wherein the second detection module is configured to detect a prize on the guide. Optionally, the amusement machine may further comprise a barrier means configured to be in a closed or open position, and arranged along the guide to stop the movement of a prize on the guide in the closed position and to allow a prize to pass through in the open position. Optionally, the control unit may be configured to control the barrier means based on any one or more of a detection result by the first and/or second detection module, a player input, a state of the game, a state of the transport mechanism.

In an exemplary embodiment, the amusement machine further comprises a barrier means configured to be in a closed or open position, and arranged upstream of the prize collecting location to stop the movement of a prize in the closed position and to allow a prize to pass through in the open position. Optionally, the control unit may be configured to control the barrier means based on any one or more of the following: a detection result by the first and/or second detection module, a player input, a state of the game, a state of the transport mechanism.

According to another aspect there is provided an amusement machine of the pusher type, comprising a playing surface, a playing piece pusher, a transport system, a guide, a detection module and a control unit. On the playing surface a plurality of playing pieces, such as coins, chips or marbles, as well as one or more prizes are supported. The playing piece pusher is configured to move over the playing surface at successive points in time in order to disturb the plurality of playing pieces and one or more prizes supported on the playing surface, and such that one or more playing pieces and/or prizes can drop over an edge of the playing surface during movement of the playing piece pusher. The transport system is configured to transport a prize which has dropped over an edge, and comprises: a prize collecting location configured to collect at least one or more prizes which have dropped over the edge, a prize infeed location configured for infeed of one or more prizes on the playing surface, and a prize transport mechanism configured to transport one or more prizes collected in the prize collecting location to the prize infeed location. The guide is provided between the prize infeed location and the playing surface and is configured to guide the one or more prizes from the prize infeed location to the playing surface. The detection module is configured to detect a prize on the guide. The control unit is configured to receive a detection result from the detection module, and to control the amusement machine in function of the detection result. Preferably, the guide is an inclined surface.

Preferably, the prize transport mechanism comprises at least one of a lift module and an Archimedes screw.

Preferably, the amusement machine comprises a further detection module configured to detect a prize between the edge and the prize collecting location. Optionally, the control unit is configured to receive a detection result from the further detection module, and to control the amusement machine in function of the further detection result.

Preferably, the amusement machine comprises a barrier means configured to be in a closed or open position, and arranged along the guide to stop the movement of a prize on the guide in the closed position and to allow a prize to pass through in the open position. Optionally, the control unit is configured to control the barrier means based on any one or more of the following: a detection result by the detection module and/or by the further detection module, a player input, a state of the game, a state of the transport mechanism.

Preferably, the transport system further comprises a playing piece collecting location configured to collect playing pieces, said playing piece collecting location being different from said prize collecting location, a playing piece infeed location configured for infeed of playing pieces, and a playing piece transport mechanism configured to transport the playing pieces collected in the playing piece collecting location to the playing piece infeed location.

The preferred or exemplary features mentioned below and above may be combined with the first and/or second aspect of the invention.

Preferably, the one or more prizes have a shape and/or size differing from the shape and/or size of a playing piece of the plurality of playing pieces. Preferably, the prizes are at least two times larger than the playing pieces. Preferably, the number of playing pieces is at least 10 times greater than the number of prizes, more preferably at least 100 times greater.

The prizes typically lie on top of the playing pieces. The volume of a prize is preferably at least twice, still more preferably at least four times, the volume of a playing piece. The prizes are for instance one or more of the following: objects provided with an indication, for instance a color, associated with a corresponding number of points, for instance blocks of different shapes and colors and so on. These can for instance be rectangular, heart-shaped or star-shaped blocks. Different types of prizes are preferably present in the machine, and these prizes are associated with a different number of points. The number of playing pieces is preferably at least 10 times greater than the number of prizes, still more preferably at least 100 times greater.

Preferably, the transport system is configured to circulate the one or more prizes in a closed loop. Preferably, the transport system is configured to circulate the plurality of playing pieces in a closed loop. The closed loop for the one or more prizes may be the same or different from the closed loop for the plurality of playing pieces. Providing a transport system which circulates both prizes and playing pieces in a closed loop in the machine avoids an operator having to replenish the prizes. An extra dimension is further imparted to the game in that a player knows that the prize is reintroduced onto the playfield.

The transport system is preferably configured to circulate in a closed loop all playing pieces and prizes present in the machine, i.e. no playing pieces or prizes are paid out to the players.

Preferably, the prize transport mechanism comprises a prize lift module and drive means for moving the prize lift module vertically upward from the prize collecting location to the prize infeed location and back, and wherein the control unit is configured for controlling the drive means in accordance with one or more of the following: a state of the game, a detection result, a player input.

Preferably, the transport system further comprises a playing piece collecting location configured to collect playing pieces, a playing piece infeed location configured for infeed of playing pieces, and a playing piece transport mechanism configured to transport the playing pieces collected in the playing piece collecting location to the playing piece infeed location.

Preferably, the amusement machine further comprises a sorting and discharge mechanism configured for sorting and discharging the one or more prizes and playing pieces which have dropped over the edge to the prize collecting location and the playing piece collecting location, respectively.

In a possible embodiment, the playing piece transport mechanism comprises a hopper module configured to move the playing pieces upward in an orderly row.

In another possible embodiment, the playing piece transport mechanism comprises a screw of Archimedes configured to move the playing pieces upward in an orderly row.

In a possible embodiment, the playing piece transport mechanism comprises a swing arm, said swing arm being configured to move over the playing surface, and to guide the playing pieces through the swing arm to an outlet of the swing arm, which outlet is located above the playing surface. Also, the playing piece transport mechanism may comprise a chute, said chute being configured to guide the playing pieces, preferably marbles, to an outlet of the chute, which outlet is near the playing surface or near a guide leading to the playing surface.

In an exemplary embodiment, the prize transport mechanism is provided with a receiving means which can be placed in a first position for receiving at least one or more prizes in the prize collecting location, and can be placed in a second position for dispensing at least one or more prizes in the prize infeed location.

Preferably, the amusement machine further comprises operating means controllable by a player and a drive means for moving the receiving means from the first to the second position, which operating means are coupled to the drive means optionally via the control unit.

In an exemplary embodiment, the amusement machine is a multiplayer with a plurality of playing surfaces, including the stated playing surface, which plurality of playing surfaces are arranged around a central zone, wherein the prize collecting location and the prize infeed location lie one above the other in the central zone.

In an exemplary embodiment, the one or more prizes comprise a prize with a transparent casing in which a valuable object and an identification means are arranged. The valuable object may comprise cash money, such as a bank note. Preferably, the identification means comprises an RFID tag.

According to an exemplary embodiment, the machine comprises a collecting location configured to collect playing pieces and prizes, and an infeed location configured to collect playing pieces and prizes. A lift module configured for joint transport of the playing pieces and prizes is then preferably provided between the collecting location and the infeed location. In this embodiment the prizes and playing pieces thus circulate together in one closed loop.

According to an exemplary embodiment, the machine comprises a first collecting location configured to collect prizes without playing pieces and a second collecting location configured to collect playing pieces without prizes, a first infeed location configured for infeed of prizes and a second infeed location configured for infeed of playing pieces. A first lift module configured to transport the prizes collected in the first collecting location is preferably provided between the first collecting location and the first infeed location, and a second lift module configured to transport the playing pieces collected in the second collecting location is provided between the second collecting location and the second infeed location.

Two closed loops can thus be distinguished in this embodiment: one for the prizes and one for the playing pieces.

In an exemplary embodiment the first lift module comprises drive means for moving the lift module obliquely or vertically upward from the first collecting location to the first infeed location and back, and a control unit for controlling the drive means in accordance with at least one of a state of the game, a detection result by one or more detection modules, a player input.

In an exemplary embodiment the second lift module comprises a hopper module configured to move the playing pieces upward in an orderly row. In an exemplary embodiment the machine comprises a swing arm which connects to the second location and which is configured to move over the playing surface, which swing arm is further configured to guide the playing pieces through the swing arm to an outlet of the swing arm, which outlet is located above the playing surface.

In an embodiment with a first and second collecting/infeed location the discharge channel can be provided with a first outlet which connects to the first collecting location and with a second outlet which connects to the second collecting location. A sorting and discharge mechanism is then preferably provided in the discharge channel for discharging prizes to the first outlet and for discharging playing pieces to the second outlet.

According to an advantageous embodiment, the transport system comprises a first lift module movable between the first collecting location and the higher first infeed location, and drive means for moving the lift module from the first collecting location to the first, higher infeed location and back, which lift module is configured to support one or more playing pieces and/or prizes. With such a lift module prizes, and optionally also playing pieces, can thus be transported to the first infeed location, and they can be reintroduced onto the playfield from the first infeed location. The first lift module is preferably provided with a receiving means which can be placed in a first position for receiving prizes, and optionally also playing pieces, in the first collecting location and can be placed in a second position for dispensing prizes, and optionally also playing pieces, in the first infeed location. The amusement machine can further comprise operating means controllable by a player and a drive means for moving the receiving means from the first to the second position, which operating means are coupled to the drive means, e.g. through the control unit. A player will in this way be able to determine the moment at which a prize and/or playing piece drops back onto the playing surface.

According to a possible embodiment, the transport system comprises an Archimedes screw with a lower end adjacent to the collecting location and an upper end adjacent to the infeed location. The screw thus functions here as a transport means which moves the playing pieces and prizes upward together, wherein the dimensions of the screw are such that both prizes and playing pieces can be transported by the screw.

According to an advantageous embodiment, a guide is provided between the higher first infeed location and the playing surface, which guide is configured to guide the one or more playing pieces and prizes from the first infeed location to the playing surface. The guide is preferably a downward inclining surface.

BRIEF DESCRIPTION OF THE DRAWINGS

The present invention will be further elucidated on the basis of a number of by no means limitative exemplary embodiments with reference to the accompanying drawings, in which.

DESCRIPTION OF THE INVENTION

Figure 1A:
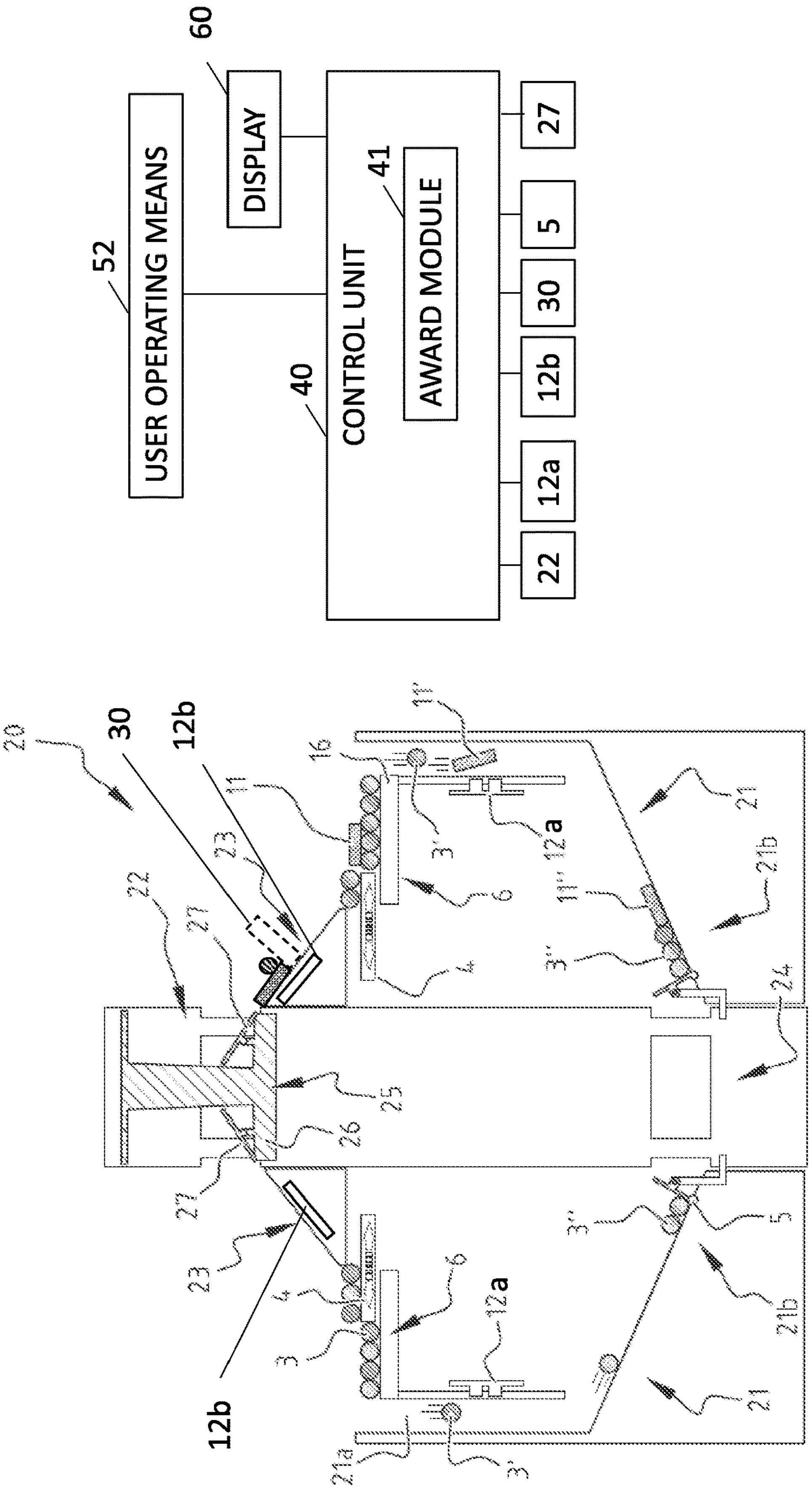
FIG. 1A, FIG. 2 and FIG. 3 illustrate schematically a first embodiment of an amusement machine in different positions of the lift module.
Figure 2:
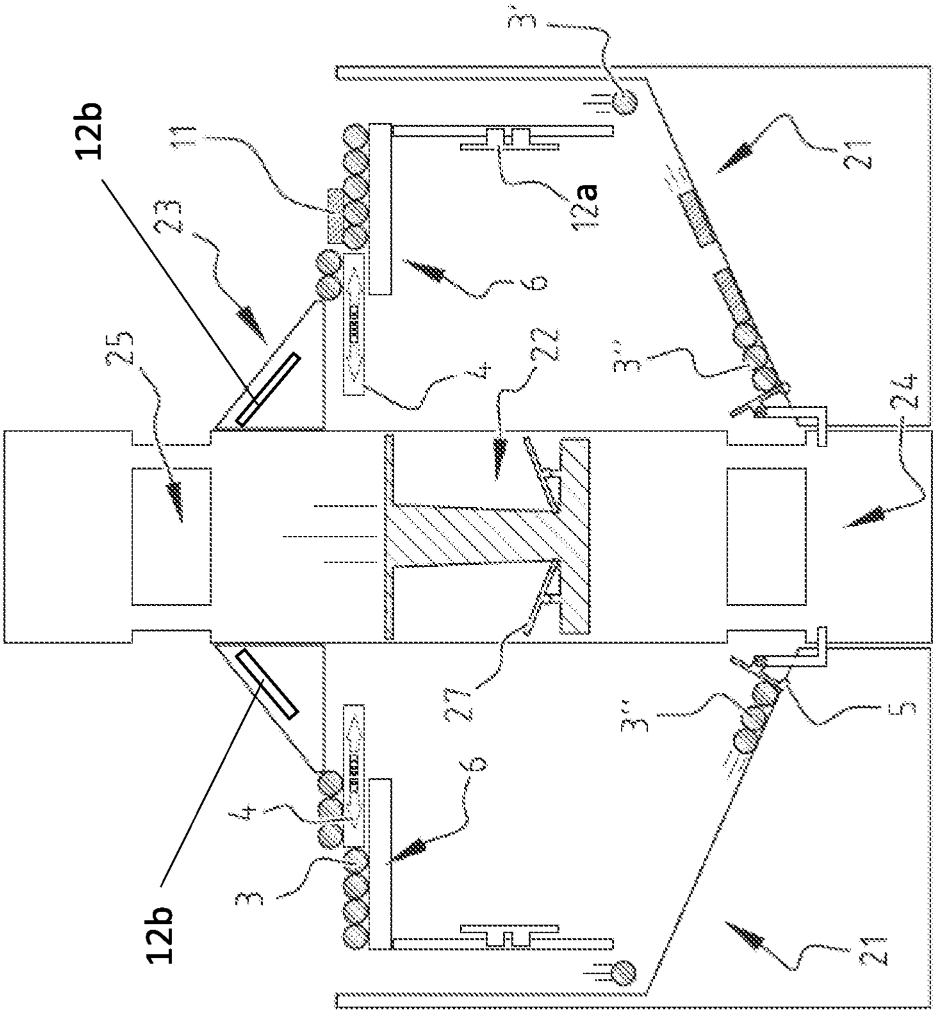
Figure 3:
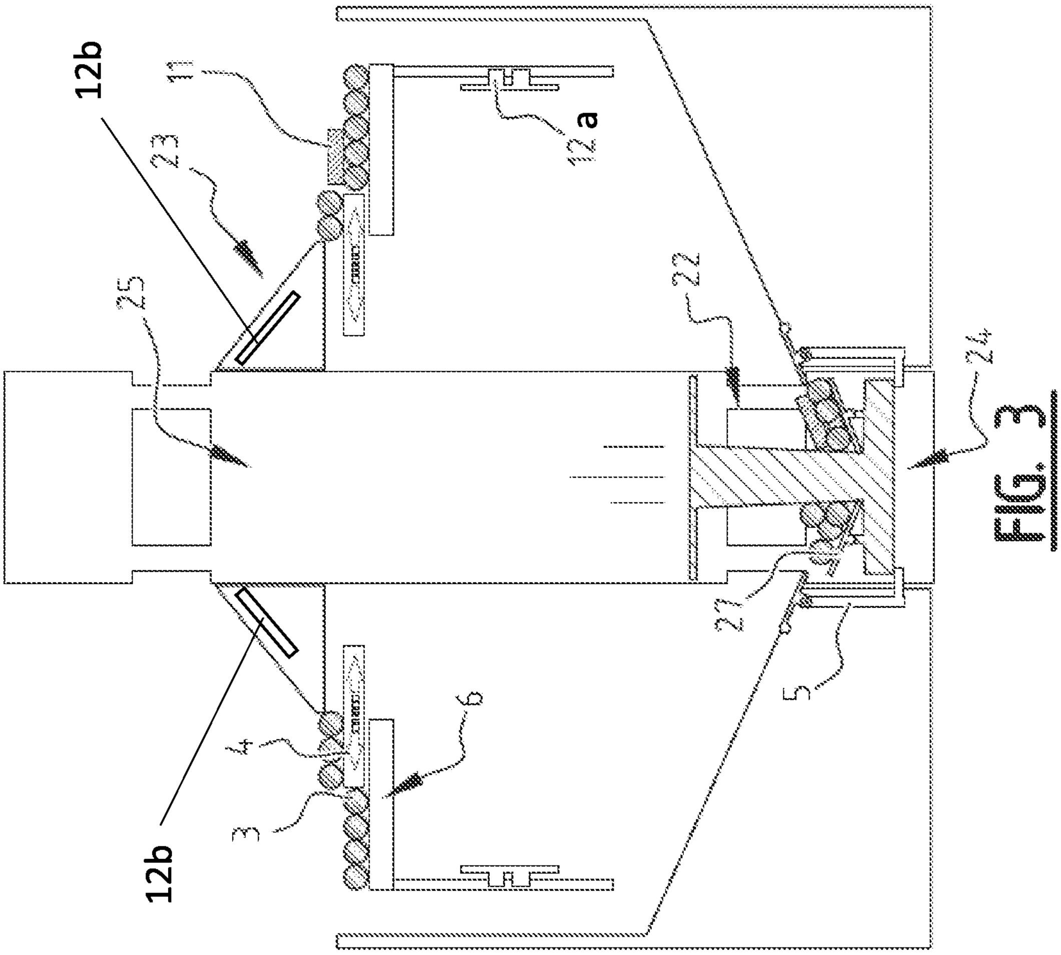

FIG. 1A, FIG. 2 and FIG. 3 illustrate a first embodiment of an amusement machine of the pusher type according to the invention in different positions of lift module 22, see below. In the embodiment of FIG. 1A the amusement machine is a so-called multiplayer, for instance a six-player with six playfields 6. Two playfields or playing surfaces 6 can be seen in FIG. 1A, FIG. 2 and FIG. 3. FIG. 1A, FIG. 2 and FIG. 3 are schematic cross-sections of the machine, and the skilled person will appreciate that the multiplayer can for instance be a two-player, a three-player, a four-player, a six-player and so on. It is further also possible to provide only one playfield 6, wherein the left or right half of FIG. 1A (and FIG. 2 and FIG. 3) is then omitted.

The amusement machine comprises a playing piece pusher 4 for each playing surface 6. Playing surface 6 is typically a horizontal surface on which are supported a plurality of playing pieces 3, such as coins, chips or marbles, as well as a number of prizes 11. If marbles are used for gameplay, playing surface 6 can for instance be provided with corrugations. Note that playing surface 6 need not necessarily be horizontal, and can also be placed at a slight angle of inclination. Prizes 11 are typically considerably larger than playing pieces 3, and there are considerably fewer prizes 11 than playing pieces 3, for instance less than one prize 11 per hundred playing pieces 3. The playing piece pusher 4 is configured to move over playing surface 6 at successive points in time in order to disturb the plurality of playing pieces 3 and prizes 11 supported on playing surface 6. During movement of the playing piece pusher 4 one or more playing pieces 3 and/or prizes 11 can drop over an edge 16 of playing surface 6, see reference numerals 3' and 11'. The playing piece pusher 4 can for instance be a plate (box) which moves reciprocally over playfield 6 in the direction of edge 16. In the case of a multiplayer the playing piece pusher can also be one central plate or box which moves over the different playing surfaces 6 of the multiplayer.

The amusement machine further comprises a transport system 20 configured to transport a prize which has dropped over an edge, either to a collecting location 24 (as illustrated) or to a discharge location (not shown). In the illustrated embodiment, transport system 20 is configured to collect one or more playing pieces 3 and/or prizes 11 which have dropped over edge 16 in collecting location 24 for the purpose of transporting the one or more playing pieces 3 and/or prizes 11 from collecting location 24 to a higher infeed location 25 and for reintroducing the one or more playing pieces 3 and prizes 11 onto playing surface 6 from the higher infeed location 25. Preferably, the transport system 20 comprises a first transport mechanism, here a lift module 22, configured to transport one or more prizes collected in the collecting location 24 to the infeed location 25. In FIG. 3 lift module 22 is in a low position, in which the playing pieces 3 and/or prizes 11 which have dropped over edge 16 come to lie in collecting location 24. In FIG. 1A lift module 22 is in a high position, in which playing pieces 3 and/or prizes 11 which have been carried upward can be reintroduced onto playfield 6 from infeed location 25. Transport system 20, and in particular lift module 22 may be controlled by a control unit 40, e.g. in function of any one or more of a state of the game, a detection result (see further), an operator input, etc.

The amusement machine further comprises user operating means 52 configured to be operated by a user. The user operating means 52 can for instance comprise a button and a joystick. Optionally, one or more display screens 60 may be provided, e.g. above and behind a playfield 6 and/or on the side of a playfield 6. Typically, the one or more display screens 60 may be arranged within a field of view of a player playing the game. The credits of a player can for instance be stated on this display screen. Also, when a prize is detected by one of the detection modules (see further) this may be displayed on the display screen. Also, the movement of a prize through the machine may be made visible on the display screen using the detection results of the detection modules. Further, alarm messages, e.g. when a prize is blocked or lost in the transport system 20 (see further) may be displayed on the screen.

In the illustrated embodiment transport system 20 comprises a guide 23, such as a sloping surface, between infeed location 25 and playing surface 6. Guide 23 is configured to guide the playing pieces 3 and/or prizes 11 from the infeed location 25 to the playing surface 6. However, the skilled person understands that playing pieces 3 and/or prizes 11 may also drop directly on the playing surface from the infeed location 25. Optionally, there may be provided a barrier means 30, e.g. arranged along the guide 23 or at the infeed location 25, and configured to temporarily stop one or more playing pieces 3 and/or prizes 11 in a closed position thereof, and to allow one or more playing pieces 3 and/or prizes 11 to pass through in an open position thereof. Barrier means 30 may be controlled by a control unit 40, e.g. in function of any one or more of a state of the game, a detection result (see further), a player input which has been input through the user operating means 52, a state of the lift module 22, etc.

In the illustrated embodiment transport system 20 comprises a discharge channel 21 which extends between edge 16 of playing surface 6 and collecting location 24. Discharge channel 21 has an inlet 21*a* into which drop the one or more playing pieces 3 and/or prizes 11 which have dropped over the edge 16, see reference numerals 3' and 11', and an outlet 21*b* which connects to collecting location 24. Optionally, a further barrier means 5, such as a gate, can be provided between outlet 21*b* and collecting location 24 for temporarily holding back one or more playing pieces 3" and prizes 11". Further barrier means 5 may be controlled by a control unit 40, e.g. in function of any one of more of a state of the game, a detection result (see further), a player input which has been input through the user operating means 52, a state of the lift module 22, etc.

In the illustrated embodiment lift module 22 is provided with a base 26 on which a movable receiving means 27, such as a tiltable receiving means 27 is provided. There may be provided a movable receiving means for each playing surface 6. Receiving means 27 is configured to receive one or more playing pieces 3 and/or prizes 11 in a receiving state and to discharge one or more playing pieces 3 and/or prizes 11 in a discharge state. Receiving means 27 may be controlled by a control unit 40 to be either in the receiving state as illustrated in FIG. 3 or in the discharging state as illustrated in FIG. 1A, e.g. in function of any one of more of a state of the lift module 22, a state of the game, a detection result (see further), etc. As shown in FIG. 3, barrier means 5 can be in an open position when lift module 22 is in the low position, whereby one or more playing pieces 3 and/or prizes 11 come to lie in receiving means 27 at collecting location 24. Receiving means 27 can for instance consist of a tiltable receptacle with an open end through which the playing pieces and prizes can be received in the receptacle. Once one or more playing pieces 3 and/or prizes 11 have been received, lift module 22 can be moved upward, see FIG. 2, and barrier means is put in the closed position. When lift module 22 reaches the high position which corresponds to the higher infeed location 25, receiving means 27 can be tilted such that the one or more playing pieces 3 and/or prizes 11 are released and can be reintroduced onto playing surface 6, e.g. via optional guide 23. When barrier means 30 is present, the one or more playing pieces and/or prizes may first be stopped, and the barrier means 30 may be put in the open position, e.g. in function of any one or more of a state of the game, a detection result (see further), a state of the lift module 22, etc. This sequence of events may be controlled by the control unit 40.

In addition or alternatively, lift module 22 may be combined with another control mechanism (not shown), such as a pusher mechanism, configured to move one or more playing pieces and/or prizes in lift module 22 in the low state thereof, and to discharge one or more playing pieces and/or prizes out of lift module 22 in the high state thereof.

The amusement machine further comprises a first detection module 12*a* and a second detection module 12*b*. The first detection module 12*a* is configured to detect a prize 11" which has dropped over edge 16, at a first location in the transport system 20. The second detection module 12*b* is configured to detect the prize 11" at a second location in the transport system 20, said second location being different from the first location. The control unit 40 is configured to receive a first detection result from the first detection module 12*a* and a second detection result from the second detection module 12*b*, and to control the amusement machine in function of the first and/or second detection result.

First and/or second detection module 12*a*, 12*b* can for instance be an RFID reader module and prize 11" can for instance be provided with an RFID tag which is readable by the RFID reader module. However, also other detection techniques may be used. For example, in addition or alternatively a camera in combination with object recognition software may be used. First and/or second detection module 12*a*, 12*b* may be the same or different.

Preferably, the control unit 40 comprises an award module 41 configured for awarding a number of prize points to the player if the control unit 40 has received a first detection result from first detection module 12*a* indicating the detection of a prize 11" and a second detection result from second detection module 12*b* indicating the detection of the same prize 11".

In the illustrated embodiment, first detection module 12*a* is arranged to detect a prize between edge 16 of playing surface 6 and collecting location 24, and the second detection module 12*b* is arranged to detect a prize between infeed location 25 and playing surface 6. In that manner it can be ascertained by the control unit 40 that a prize which has dropped over the edge is effectively reintroduced on the playing surface 6, and not lost somewhere in the transport system 20. For example, if only a first detection result is received and not a second detection result, an alarm may be generated by the control unit 40 in order to inform an operator that there is a problem. Also, by introducing such double-check detection, it is made certain that prizes which fall over edge 6 are detected. Further, a prize may be followed through the transport system 20 by having more than one detection module.

Figure 1B:
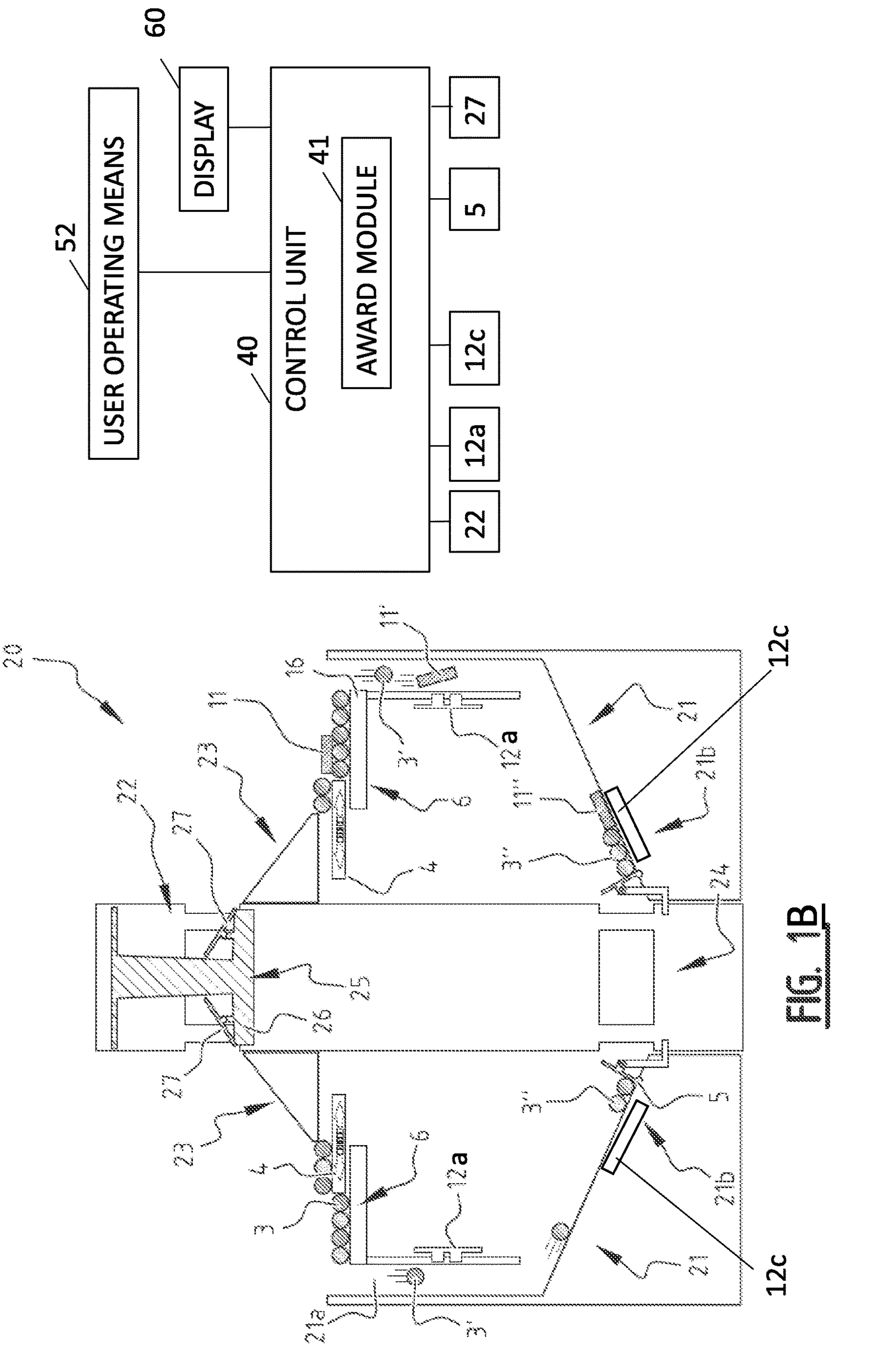
FIG. 1B and FIG. 1C illustrate variants of the embodiment of FIG. 1A.

In an alternative embodiment illustrated in FIG. 1B, both first detection module 12*a* and second detection module 12*c* are located to detect a prize between edge 16 of playing surface 6 and collecting location 24, at a first location and a second location, respectively. Second location is located downstream of the first location.

Figure 1C:
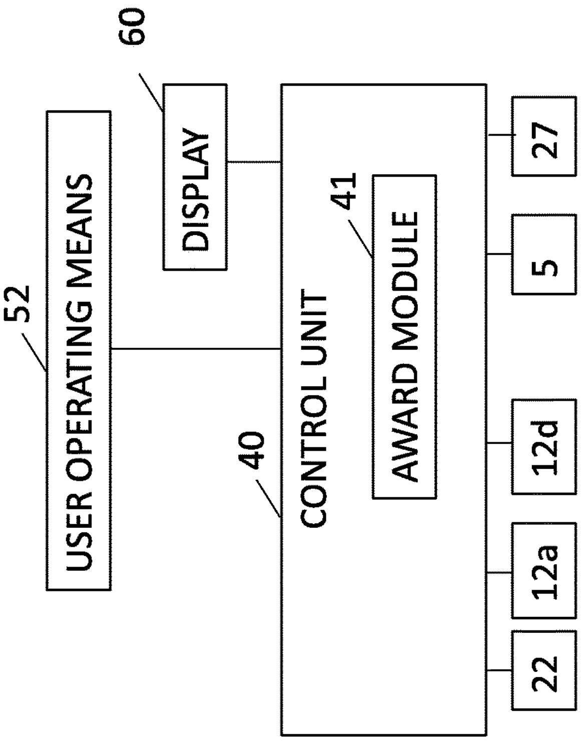
Figure 1C:
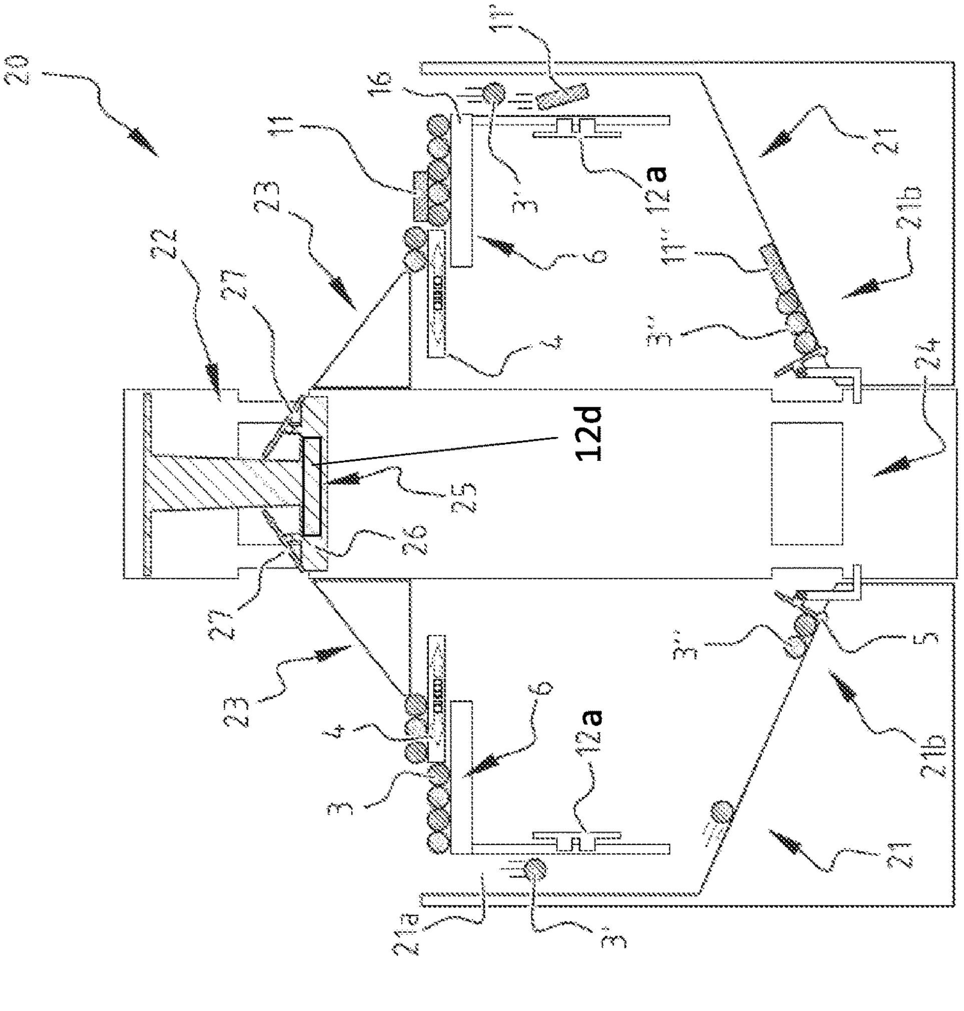

In another alternative embodiment illustrated in FIG. 1C, first detection module 12*a* is located to detect a prize between edge 16 of playing surface 6 and collecting location 24, and second detection module 12*d* is located in the lift module 22.

It is noted that more than two detection modules may be present and any combination of two or more detection modules 12*a*, 12*b*, 12*c*, 12*d* is possible The control unit 40 is configured for controlling the transport system in function of first and/or second detection results of the first and/or second detection module (12*a* and/or 12*b* in the embodiment of FIG. 1A; 12*a* and/or 12*c* in the embodiment of FIG. 1B; and 12*a* and/or 12*d* in the embodiment of FIG. 1C), and in particular in function of a number of prizes detected by the first and/or second detection module. For example, an alarm may be generated by the control unit 40, if a prize is detected by one of the detections modules and not by the other detection module.

Further, in the embodiments of FIGS. 1A, 1B and 1C the game can be made more attractive to a player by providing different prizes 11 on playing surface 6, on top of playing pieces 3. These prizes 11 are preferably considerably larger than playing pieces 3 such that they are easily recognizable by the user. The prizes can for instance have a readily identifiable shape and color. In contrast to prior art solutions, prizes 11 can circulate in embodiments according to the present invention in a so-called closed loop in the amusement machine. In exemplary embodiments both playing pieces 3 and prizes 11 can thus circulate in a closed loop in the amusement machine. Prizes 11 are pushed together with playing pieces 3 over the edge 16 of playing surface 6 and are detected by a first and/or second detection module 12*a*, 12*b*, 12*c*, 12*d*. The detection modules 12*a*, 12*b*, 12*c*, 12*d* can co-act with an award module 41 of the control unit 40 for awarding a number of prize points to the player in accordance with the detected prize 11. Following the detection of a prize 11, the one or more pieces 3 and prizes 11 can slide in the direction of gate 5, wherein the gate 5 can be opened when the lift module 22 is in the low collecting location 24. Gate 5 can be opened automatically, through control by control unit 40, when lift module 22 arrives at the low position, after which the one or more prizes 11 and/or playing pieces 3 slide into receiving means 27 and lift module 22 can be moved to the higher infeed location 25. At the higher infeed location 25 receiving means 27 can be tilted automatically and the one or more prizes 11 and/or playing pieces 3 can slide over incline 23 to playing surface 6. The one or more prizes 11 and/or playing pieces 3 come to lie on playing surface 6 by moving the pusher 4, and the cycle begins again.

An advantage of embodiments of the present invention is that the closed loop transport system is configured to use any form of prizes 11 and any type of playing piece 3, for instance coins, chips or marbles, the only condition being that the prizes 11 have to fit in receiving means 27 and that the prizes 11 be detectable by the detections modules 12*a*, 12*b*, 12*c*, 12*d*. An operator of the amusement machine can present a game which is attractive to the player and which requires no or hardly any assistance in refilling the amusement machine and/or reading prizes 11.

Figure 4:
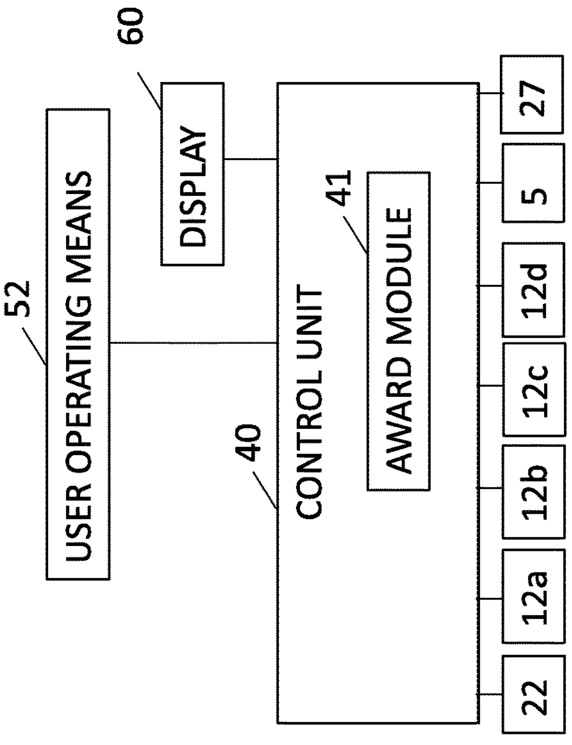
FIG. 4 illustrates schematically a second embodiment of an amusement machine.
Figure 4:
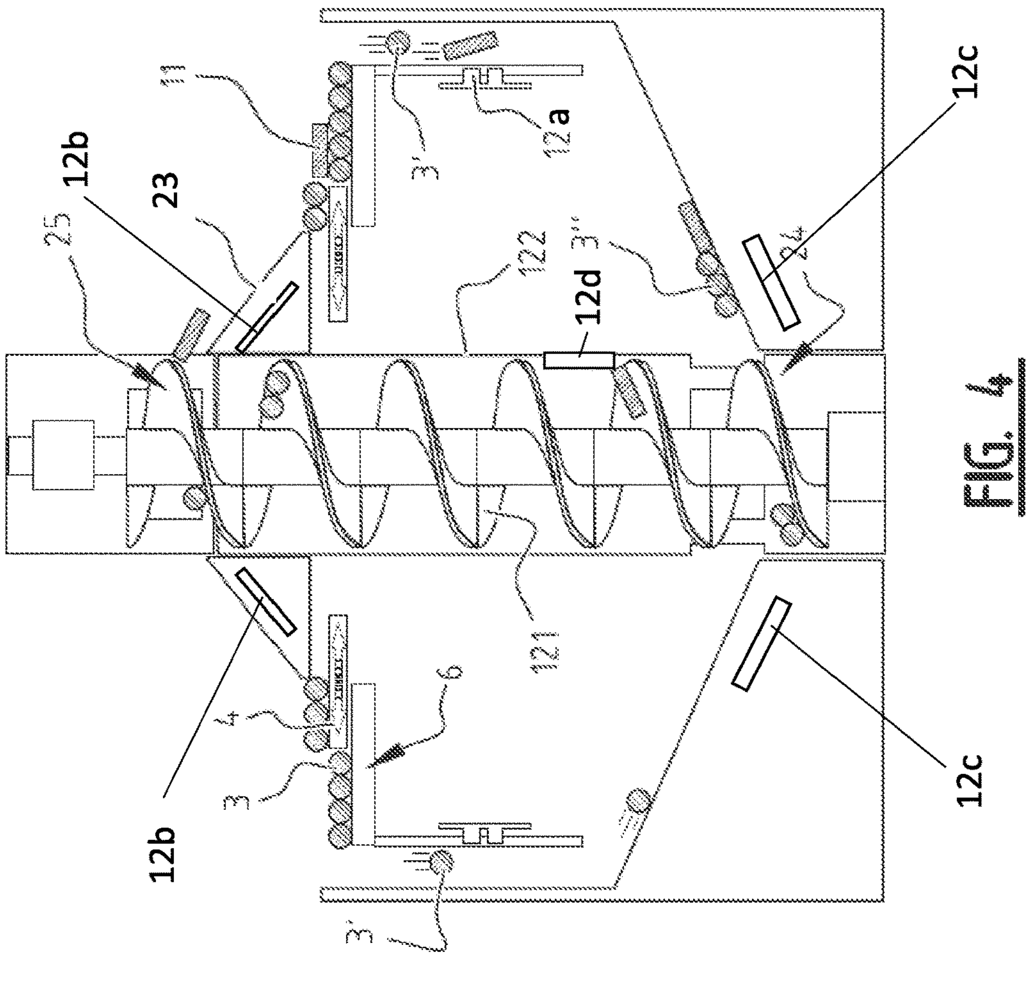

FIG. 4 illustrates a second embodiment of an amusement machine of the pusher type according to the invention. This embodiment is similar to the embodiment of FIGS. 1A-1C, with the difference that the lift module consists of an Archimedes screw 121, 122. In such an embodiment it is not necessary to provide gates 5, and the Archimedes screw 121, 122 functions as the receiving means for receiving the one or more playing pieces 3 and/or prizes 11. Playing pieces 3 and prizes 11 are collected in collecting location 24 and transported upward by screw 121 which rotates in cylinder 122. When prizes 11 and playing pieces 3 reach the higher infeed location 24, they can be carried back onto playfield 6, optionally via a guide means, here an incline 23. Optionally, there may be provided a barrier means (not shown but similar to barrier means 30 of FIG. 1A), e.g. arranged along the guide 23 or at the infeed location 25, and configured to temporarily stop one or more playing pieces 3 and/or prizes 11 in a closed position thereof, and to allow one or more playing pieces 3 and/or prizes 11 to pass through in an open position thereof. Barrier means 30 may be controlled by a control unit 40, e.g. in function of any one or more of a state of the game, a detection result (see further), a player input which has been input through the user operating means 52, a state of the Archimedes screw 121, 122, etc.

The amusement machine of FIG. 4 comprises a first detection module 12*a*, a second detection module 12*b*, a third detection module 12*c* and a fourth detection module 12*d*. However, it is also possible to use any two of the shown detection modules 12*a*, 12*b*, 12*c*, 12*d*. Further, in some embodiments only detection module 12*b* may be present. The respective detection modules 12*a*, 12*b*, 12*c*, 12*d* are configured to detect a prize 11", at a respective location in the transport system 20. The control unit 40 is configured to receive a first detection result from the first detection module 12*a*, a second detection result from the second detection module 12*b*, etc. and to control the amusement machine in function of the first and/or second and/or third and/or fourth detection result.

The detection module 12*a*, 12*b*, 12*c*, 12*d* can for instance be an RFID reader module and prize 11" can for instance be provided with an RFID tag which is readable by the RFID reader module. However, also other detection techniques may be used. For example, in addition or alternatively a camera in combination with object recognition software may be used. The detection modules 12*a*, 12*b*, 12*c*, 12*d* may be the same or different.

Preferably, the control unit 40 comprises an award module 41 configured for awarding a number of prize points to the player if the control unit 40 has received a first detection result from first detection module 12*a* indicating the detection of a prize 11" and a second detection result from second detection module 12*b*, 12*c*, 12*d* indicating the detection of the same prize 11".

In the illustrated embodiment, first detection module 12*a* is arranged to detect a prize between edge 16 of playing surface 6 and collecting location 24, and the second detection module 12*b* is arranged to detect a prize between infeed location 25 and playing surface 6. In that manner it can be ascertained by the control unit 40 that a prize which has dropped over the edge is effectively reintroduced on the playing surface 6, and not lost somewhere in the transport system 20. For example, if only a first detection result is received and not a second detection result, an alarm may be generated by the control unit 40 in order to inform an operator that there is a problem. Also, detection module 12*c* may detect how much prizes are entering in the Archimedes screw 121, 122 and detection module 12*d* may be used to check how a prize is proceeding through the Archimedes screw 121, 122. This allows for a close following of a prize 11 through the transport system 20.

The control unit 40 is configured for controlling the transport system in function of first and/or second and/or third and/or fourth detection results of the first and/or second and/or third and/or fourth detection module 12*a*, 12*b*, 12*c*, 12*d*, and in particular in function of a number of prizes detected by the detection modules. For example, an alarm may be generated by the control unit 40, if a prize is detected by one of the detections modules and not by the other detection modules.

Figure 5:
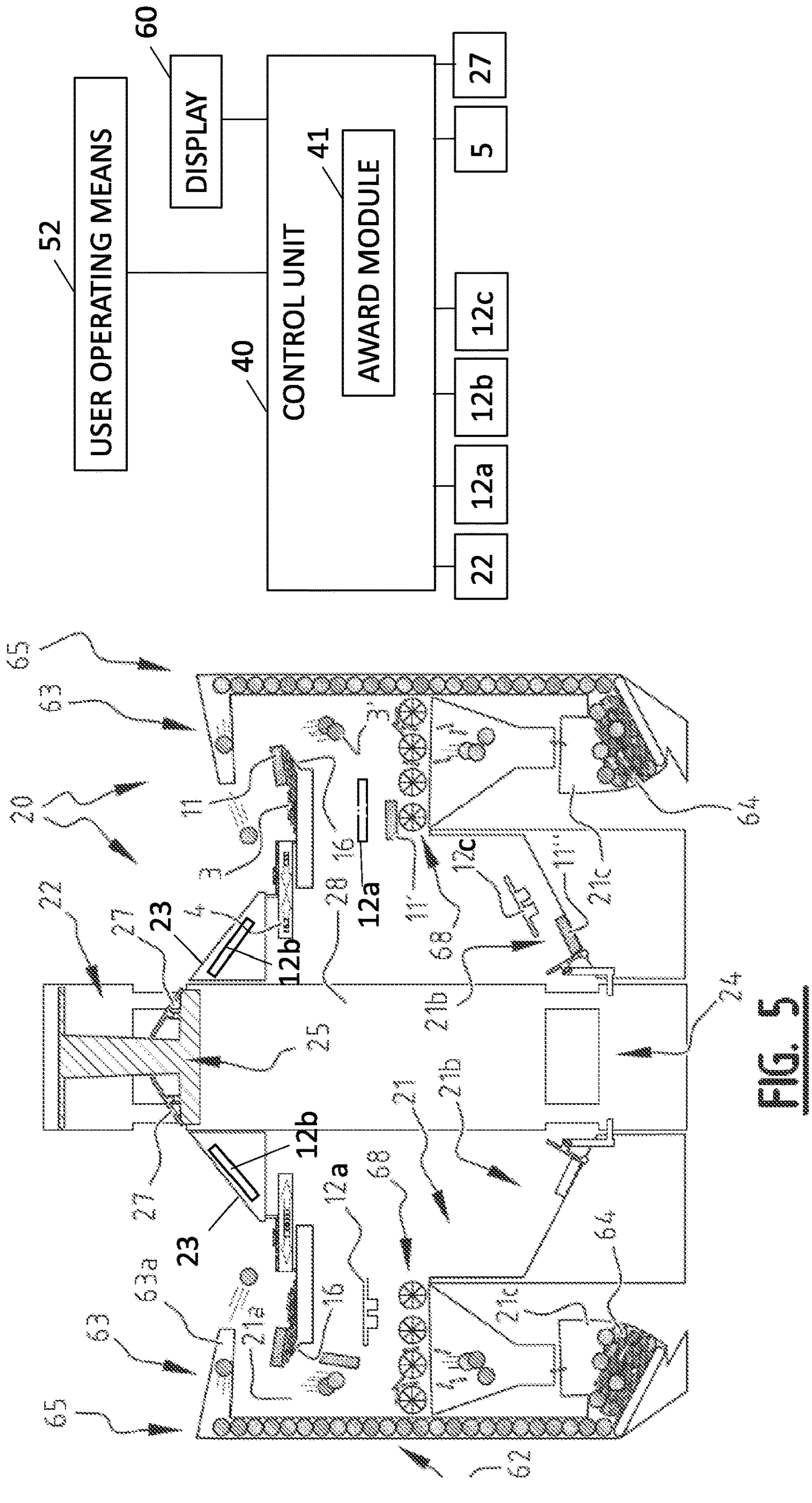
FIG. 5 illustrates schematically a third embodiment of an amusement machine.

FIG. 5 illustrates a third embodiment of the amusement machine according to the invention, where the same reference numerals are used to refer to the same or similar components. Provided in this embodiment are a prize collecting location 24 configured to collect prizes 11, preferably without playing pieces 3 and a playing piece collecting location 64 configured to collect playing pieces 3, preferably without prizes 11. Further provided are a prize infeed location 25 configured for infeed of prizes 11 without playing pieces 3 and a playing piece infeed location 65 configured for infeed of playing pieces 3 without prizes 11. Provided between the prize collecting location 24 and the prize infeed location 25 is a prize lift module 22 configured to transport the prizes 11 collected in the prize collecting location and provided between the second collecting location 64 and the second infeed location 65 is a playing piece lift module 62 configured to transport the playing pieces 3 collected in the playing piece collecting location.

The prize lift module 22 comprises drive means (not shown) for moving lift module 22 vertically upward from the prize collecting location 24 to the prize infeed location 25 and back, and a control unit 40 for controlling the drive means in accordance with a state of the game, for instance when a player still has sufficient credits. The playing piece lift module 62 comprises a hopper module, for instance an escalator hopper, which is configured to move playing pieces 3 upward in an orderly row from the playing piece collecting location 64 to the playing piece infeed location 65. Playing piece counting means (not shown) can optionally be provided in hopper module 62 for counting the number of playing pieces. This counted number can then be passed on to the control unit 40 for awarding extra credits or points to the player. Optionally, there is provided at the playing piece infeed location is a swing arm 63 which connects to the playing piece infeed location 65 and is configured to move over playing surface 6. Swing arm 63 is further configured to guide playing pieces 3 through swing arm 63 and to an outlet 63*a* of swing arm 63, which outlet 63*a* is located above playing surface 6. Operating means 52 such as a button and a joystick can further be provided for control of swing arm 63 by a player. In other embodiments, instead of a swing arm, other guide means may be provided to guide the playing pieces from the playing piece infeed location 65 to the playing surface 6.

Transport system 20 comprises a discharge channel 21 between edge 16 of playing surface 6 and prize collecting location 24 and playing piece collecting location 64. Discharge channel 21 has an inlet 21*a* into which drop the one or more playing pieces 3 and prizes 11 which have dropped over the edge, and a first outlet 21*b* which connects to the prize collecting location 24 and a second outlet 21*c* which connects to the playing piece collecting location 64. Provided in discharge channel 21 is a sorting and discharge mechanism 68 for discharging prizes 11' to first outlet 21*b* and for discharging playing pieces 3' to second outlet 21*c*. Sorting and discharge mechanism 68 comprises for instance a number of mutually spaced rollers through which the smaller playing pieces drop downward in the direction of the playing piece collecting location 64 and over which the larger prizes 11' are transported to first outlet 21*b*. In a similar embodiment the sorting and discharge mechanism 68 may be a grid dimensioned so that playing pieces can fall through the grid while the prizes are located on the grid and transported from there to the prize collecting location 24.

One or more detection module 12*a*, 12*c* can for instance be provided along discharge channel 21, e.g. detection module 12*a* upstream of sorting and discharge mechanism 68, for detecting one or more prizes 11 in discharge channel 21 immediately after a prize has dropped over the edge 16, and detection module 12*c*, downstream of sorting and discharge mechanism 68 for detecting a prize before it enters in the prize lift module 22. It is noted that it is also possible to provide only one of the detection modules 12*a*, 12*c*.

Prize lift module 22 is provided with a receiving means 27 which can be placed in a first position for receiving prizes 11 in the prize collecting location 24 and can be placed in a second position for dispensing prizes 11 at the prize infeed location 25. A drive means of the receiving means 27 may be controlled by the control unit 40. Optionally, the machine further comprises operating means 52 controllable by a player and communicating with the control unit 40 such that a player can determine when the receiving means 27 tilts. Optionally a barrier means 30 may be provided as in the embodiment of FIG. 1A. In such case, optionally, the machine further comprises operating means 52 controllable by a player and communicating with the control unit 40 such that a player can determine when the barrier means 30 is in the open position. As noted in connection with FIG. 1A, it is also possible to use, instead of a tiltable receiving means, another mechanism for allowing the prizes to move into the prize lift module 22 and to be removed from the prize lift module 22.

As described in connection with FIG. 1A, there may be provide a guide 23 between the prize infeed location 25 and the playing surface 6, and a further detection module 12*b* may be present along the guide 23 to detect a prize passing over guide 23. Optionally, when a barrier means 30 is present the detection module 12*b* may detect a prize waiting before the barrier means 30.

The skilled person will appreciate that transport system 20 can also be implemented in other ways. The transport system can thus consist of a plurality of mutually connecting conveyor belts, wherein the lift system can for instance be a conveyor belt running upward. One of the advantages of the transport systems illustrated in FIGS. 1-7 is that they are compact and can be built centrally into a multiplayer in simple manner. In addition, it is also possible to provide two parallel lift modules centrally, a first for playing pieces 3 and a second for prizes 11, wherein playing pieces 3 and prizes are pre-sorted. Additional infeed means controllable by a user could then be provided which allow the timing of the reintroduction of playing pieces 3/prizes 11 to be influenced.

Figure 7:
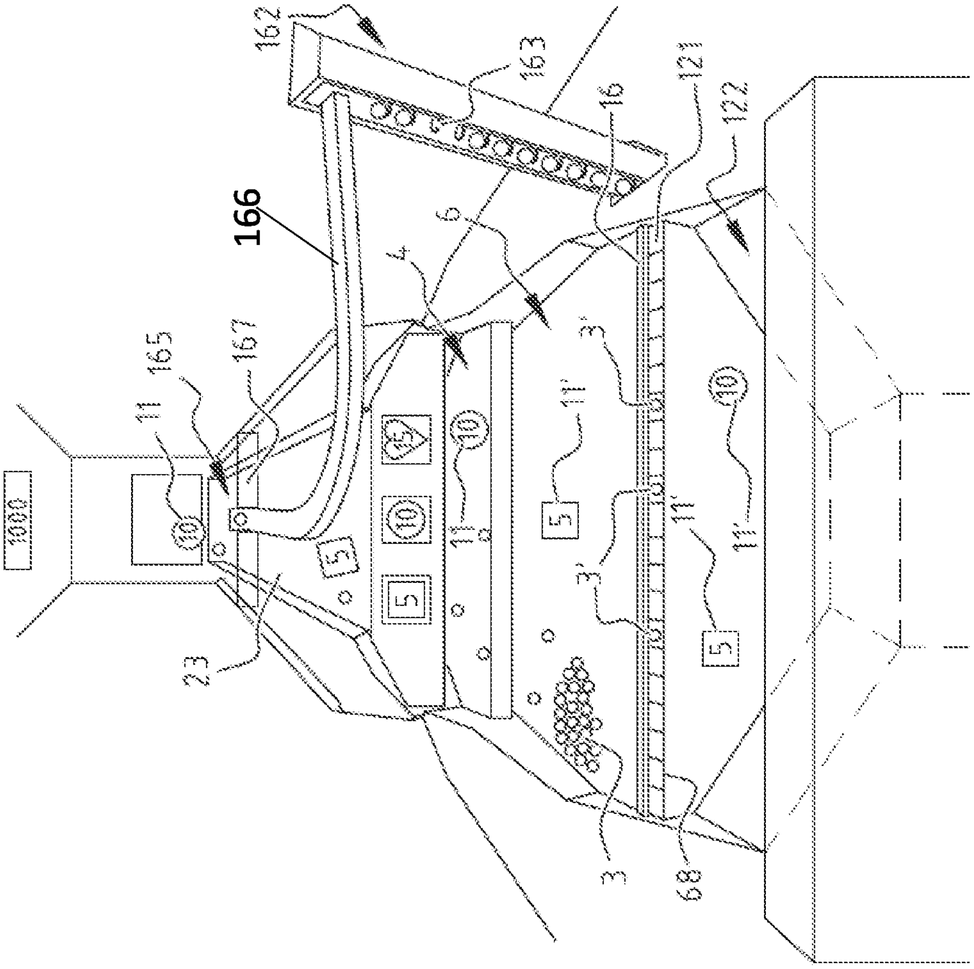
FIG. 7 and FIG. 8 illustrate schematically a third embodiment of an amusement machine.
Figure 8:
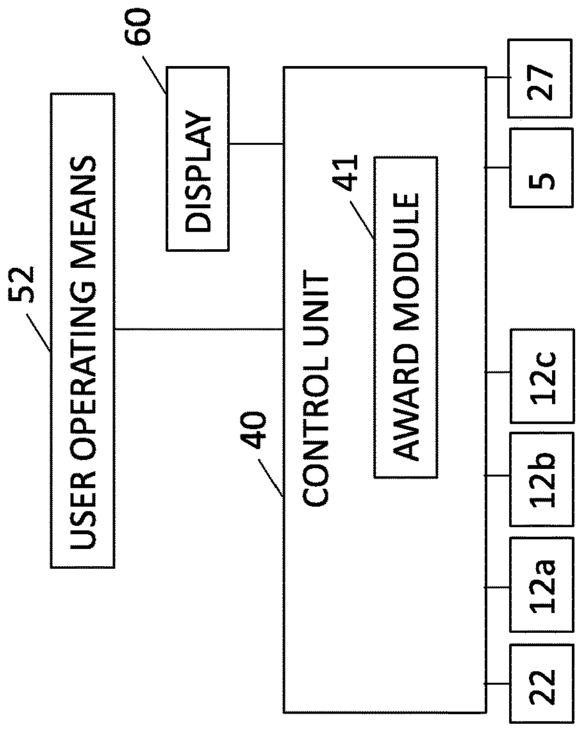
Figure 8:
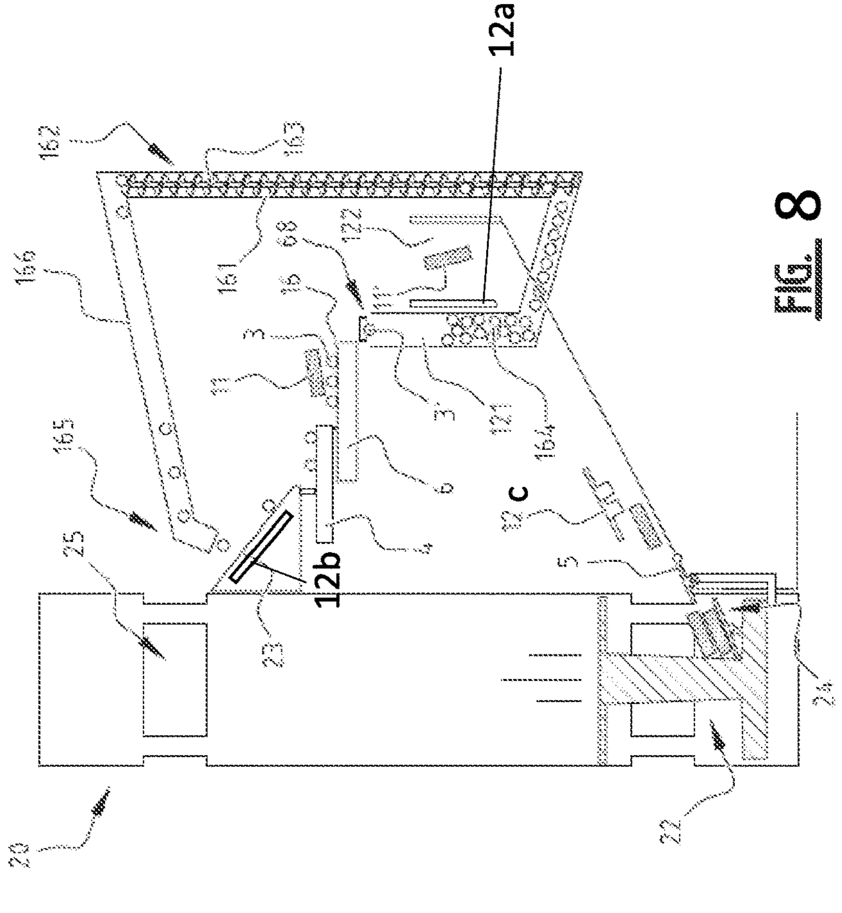

FIGS. 7 and 8 illustrate schematically a third embodiment of an amusement machine of the pusher type according to the invention which is particularly useful when using marbles as playing pieces. In the embodiment of FIGS. 7 and 8 the figures show one play area of a multiplayer, for instance a six-player with six playfields 6. The skilled person will appreciate that the multiplayer can for instance be a two-player, a three-player, a four-player, a six-player and so on. It is further also possible to provide only one playfield 6.

The amusement machine comprises a playing piece pusher 4 for each playing surface 6. Playing surface 6 is typically a horizontal surface on which are supported a plurality of playing pieces 3, such as marbles, as well as a number of prizes 11. If marbles are used for gameplay, playing surface 6 can for instance be provided with corrugations. Note that playing surface 6 need not necessarily be horizontal, and can also be placed at a slight angle of inclination. Prizes 11 are typically considerably larger than playing pieces 3, and there are considerably fewer prizes 11 than playing pieces 3, for instance less than one prize 11 per hundred playing pieces 3. In the illustrated embodiment the prizes 11 are square, round and heart shaped objects having a different color and being provided with an indication of the points associated with the prize, e.g. a blue square object associated with 5 points, a green round object associated with 10 points, and a red heart shaped object associated with 15 points. The playing piece pusher 4 is configured to move reciprocally over playfield 6 in the direction of edge 16 at successive points in time in order to disturb the plurality of playing pieces 3 and prizes 11 supported on playing surface 6. During movement of the playing piece pusher 4 one or more playing pieces 3 and/or prizes 11 can drop over an edge 16 of playing surface 6, see reference numerals 3' and 11'.

The amusement machine comprises a transport system 20 with a closed transport loop for prizes 11 and with a closed loop for playing pieces 3. The transport system 20 comprises a sorting and discharge mechanism 68 for discharging playing pieces 3' to a playing piece discharge channel 121, and for discharging prizes 11' to a prize discharge channel 122. The sorting and discharge mechanism 68 may be an elongate grid with suitable mesh dimensions such that the playing pieces 3' fall through the grid 68 into the playing piece discharge channel 121 and the prizes 11' pass over the grid 68 into the prize discharge channel 122. The grid 68 extends along the edge 16 of the playing surface 6, and the playing piece discharge channel 121 is located below the grid 68. The prize discharge channel 122 is located in front of the playing piece discharge channel 121 such that prizes 11' passing over grid 68 fall into the prize discharge channel 122. Typically the mesh dimensions will be smaller than the dimensions of a prize 11 and bigger than the dimensions of a playing piece 3.

The prize discharge channel 122 has an outlet which connects to a prize collecting location 24. The playing piece discharge channel 121 has an outlet which connects to a playing piece collecting location 164. Provided between prize collecting location 24 and prize infeed location 25 is a prize lift module 22 (see FIG. 8) configured to transport the prizes 11 collected in prize collecting location 24. When prize lift module 22 is in a low position, prizes 11 which have dropped over edge 16 come to lie in prize collecting location 24. When prize lift module 22 is in a high position prizes which have been carried upward can be reintroduced onto playfield 6 from prize infeed location 25. A closing means such as a gate 5 (see also FIG. 1A) can be provided between outlet of prize discharge channel 122 and prize collecting location 24 for temporarily holding back one or more prizes. Prize lift module 22 may be implemented as described above for the embodiment for FIG. 5 but may also be implemented as described in connection with FIG. 4. Provided between playing piece collecting location 164 and a playing piece infeed location 165 is a playing piece lift module 162 configured to transport playing pieces 3 collected in playing piece collecting location 164. The playing piece lift module 162 may comprise an Archimedes screw 163. The Archimedes screw 163 functions as the receiving means for receiving the one or more playing pieces 3, preferably marbles. Playing pieces 3 are collected in playing piece collecting location 164 and transported upward by screw 163 which rotates in a cylinder 161.

In the embodiment of FIG. 8, transport system 20 comprises a guide 23, such as a sloping surface, between prize infeed location 25 and playing surface 6. Guide 23 is configured to guide the playing pieces 3 and/or prizes 11 from the respective infeed locations 25, 165 to the playing surface 6. However, the skilled person understands that playing pieces 3 and/or prizes 11 may also drop directly on the playing surface from the respective infeed locations 25, 165. Optionally, there may be provided a barrier means (not shown, but similar to the barrier means of FIG. 1A), e.g. arranged along the guide 23, and configured to temporarily stop one or more prizes 11 in a closed position thereof, and to allow one or more prizes 11 to pass through in an open position thereof. Barrier means may be controlled by control unit 40, e.g. in function of any one or more of a state of the game, a detection result, a player input which has been input through the user operating means 52, a state of the prize lift module 22, etc. The playing pieces 3 could be introduced upstream and/or downstream of the barrier means.

When playing pieces 3 reach the top of the playing piece lift module 162, they can be carried back onto playfield 6 via a chute 166 which is configured to dispense the playing pieces 3 on the inclined surface 23. The playing pieces 3 slide or roll on the inclined surface 23, on the playfield 6 via pusher 4. Optionally there may be provided a guide piece 167 at a distance above the inclined surface 23 to ensure that playing pieces 3 follow the incline 23 as they move towards the playfield 6.

One or more detection modules 12*a*, 12*c* may be provided along prize discharge channel 122, after sorting and discharge mechanism 68, for detecting one or more prizes 11 in prize discharge channel 122. A further detection module 12*b* may be provided to detect a prize on the guide 23, as described above in connection with FIG. 1A. Detection modules 12*a*, 12*b*, 12*c* can for instance be an RFID reader module, and prizes 11 can for instance be provided with an RFID tag which is readable by the RFID reader module.

In contrast to prior art solutions, prizes 11 can circulate in the third embodiment in a closed loop in the amusement machine, via prize discharge channel 122 and prize lift module 22, wherein prizes can be detected in a reliable manner Prizes 11 are pushed together with playing pieces 3 over the edge 16 of playing surface 6, are sorted by grid 68, and are detected in prize discharge channel 122 by one or more detection modules 12*a*, 12*c* and/or are detected when reintroduced in the game from the prize infeed location 25 by a further detection module 12*b*, see FIG. 8.

The detection modules 12*a*, 12*b*, 12*c* can co-act with an award module 41 of the control unit 40 for awarding a number of prize points to the player in accordance with the detected prize 11. Following detection of a prize 11 by detection module 12*a* and/or 12*c*, the prize 11 slides in the direction of gate 5, wherein the gate can be opened when the prize lift module 22 is in the low prize collecting location 24. The one or more prizes 11 slide into the prize lift module 22 and prize lift module 22 is moved to the higher prize infeed location 25. At the higher prize infeed location 25 the one or more prizes 11 can slide over incline 23 to playing surface 6. The one or more prizes 11 come to lie on playing surface 6 by moving the pusher 4, and the cycle begins again.

Playing pieces 3 circulate in a closed loop, via playing piece discharge channel 121, playing piece lift module 162 and chute 166. The playing piece lift module 162 comprises drive means (not shown) for moving playing piece lift module 162 vertically upward from the playing piece collecting location 24 to the playing piece infeed location 165 and back. The control unit 40 may control the drive means of the playing piece lift module 162 in accordance with a state of the game, for instance the drive means may be actuated as long as a player still has sufficient credits. The playing piece lift module 162 with screw 163 is configured to move playing pieces 3 upward in an orderly row from the playing piece collecting location 164 to the playing piece infeed location 165. Playing piece counting means (not shown) can optionally be provided for counting the number of playing pieces. This counted number can then be passed on to a control module (not shown) for awarding extra credits or points to the player. Operating means 52 such as a button and a joystick can further be provided for controlling the adding of playing pieces 3 by a player via the screw 163 and chute 166.

In an exemplary embodiment the control unit 40 may be configured to operate the prize lift module 22 when a predetermined number of prizes has been collected in the playing piece collecting location 24, e.g. prizes. When the predetermined number of prizes has been collected, the gate 5 is closed and the prize lift module 22 is moved upwardly to dispense the prizes from the prize infeed location 25 back on the playing surface 26. The control unit 40 may be further connected with the operator means 52, such as a button and/or a joystick, and may be configured to control the adding of a prize and/or playing pieces in function of the inputs of the player input via the operator means 52. E.g. whenever the player presses a button, a playing piece may be added on the playing surface 6.

Figure 9:
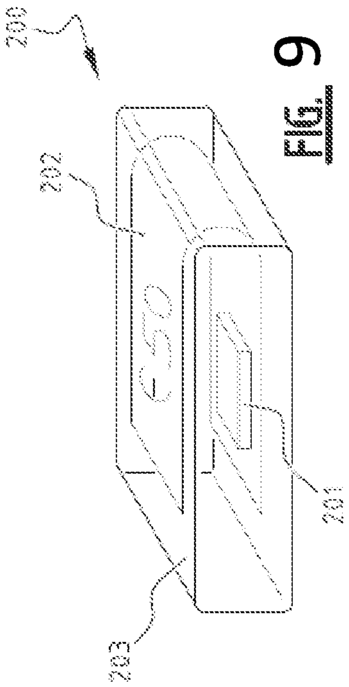
FIG. 9 illustrates an exemplary embodiment of a prize of the invention.

FIG. 9 illustrates an exemplary embodiment of a prize which may be used in amusement machines of the invention.

The prize 200 comprises a transparent casing in which a valuable object 202, here a 50 EUR banknote, and identification means, e.g. an RFID tag 201. Including a valuable object 202 in a transparent casing, has the advantage that the prize can be easily manipulated within a closed loop in the amusement machine, and that the player sees a real prize. By including an RFID tag 201 the prize 202 can be identified by an RF ID reader, described in the various embodiments as detection means 12, and a player may receive a ticket on which the prize is indicated through payment means of the amusement machine. With this ticket he may then collect the real prize.

The skilled person will also appreciate that, instead of two platforms (playfield 6 and pusher 4), more than two platforms can also be provided, wherein one or more of the platforms are movable.

Figure 6:
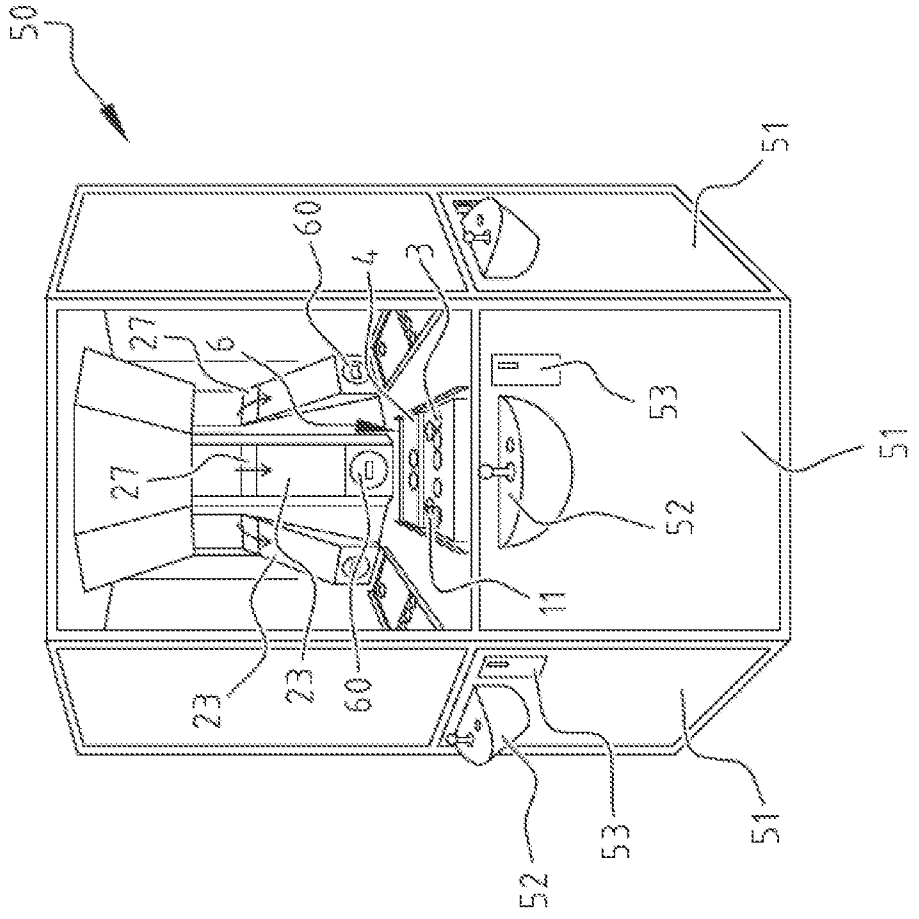
FIG. 6 illustrates schematically a perspective view of a fourth embodiment of an amusement machine.

Finally, FIG. 6 illustrates a schematic perspective view of a multiplayer intended for six players and comprising six playing surfaces 6. This amusement machine can further be configured as described in the first embodiment of FIGS. 1A-1C, or as described in the second embodiment of FIG. 4, or as described in the third embodiment of FIG. 5, or as described in the fourth embodiment of FIGS. 7-8. The multiplayer comprises a housing with six side walls 51, an upper part of which takes a transparent form in each case in order to make the associated playfield 6 visible. Side walls 51 are typically provided with operating means 52 for adding a playing piece 3 and/or a prize 11 on playfield 6 and/or for moving an additional arm (not shown) with which playing pieces 3 can be thrown onto playfield 6. These operating means 52 can for instance comprise a button and a joystick. In the embodiment of FIG. 5 the joystick and the button can be configured to move the swing arm. A display screen 60 is further provided above each playfield 6. The credits of a player can for instance be stated on this display screen. Also, when a prize is detected by one of the detection modules 12*a*, 12*b*, 12*c*, 12*d* this may be displayed on the display screen. Also, the movement of a prize through the machine may be made visible on the display screen using the detection results of the detection modules 12*a*, 12*b*, 12*c*, 12*d*. A payment module 53 is further provided in each wall 51. This payment module 53 can for instance be configured for purchase of credits with cash (coins and/or notes) or for purchase of credits with other payment means, such as a credit card.

The invention is not limited to the above-described embodiments and the skilled person will appreciate that many modifications and variants can be envisaged within the scope of the invention, which is defined solely by the following claims.

The invention claimed is:

1. An amusement machine of the pusher type, comprising:

a playing surface on which a plurality of playing pieces, such as coins, chips or marbles, as well as one or more prizes are supported, a playing piece pusher configured to move over the playing surface at successive points in time in order to disturb the plurality of playing pieces and one or more prizes supported on the playing surface, and such that one or more playing pieces and/or prizes can drop over an edge of the playing surface during movement of the playing piece pusher;

a transport system configured to transport a prize which has dropped over an edge;

a first detection module configured to detect a prize which has dropped over the edge, at a first location in the transport system, a second detection module configured to detect the prize at a second location in the transport system, said second location being different from the first location; and a control unit configured to receive a first detection result from the first detection module and a second detection result from the second detection module, and to control the amusement machine in function of the first and/or second detection result, wherein the control unit is configured to generate an alarm message when a first detection result by the first detection module indicates the detection of a prize and a second detection result by the second detection module does not indicate the detection of the same prize within a predetermined time from the first detection result.

2. The amusement machine of claim 1, wherein the transport system comprises: a prize collecting location configured to collect at least one or more prizes which have dropped over the edge, a prize infeed location configured for infeed of one or more prizes on the playing surface, and a prize transport mechanism configured to transport one or more prizes collected in the prize collecting location to the prize infeed location.

3. An amusement machine of the pusher type, comprising:

a playing surface on which a plurality of playing pieces, such as coins, chips or marbles, as well as one or more prizes are supported, a playing piece pusher configured to move over the playing surface at successive points in time in order to disturb the plurality of playing pieces and one or more prizes supported on the playing surface, and such that one or more playing pieces and/or prizes can drop over an edge of the playing surface during movement of the playing piece pusher;

a transport system configured to transport a prize which has dropped over an edge;

a first detection module configured to detect a prize which has dropped over the edge, at a first location in the transport system, a second detection module configured to detect the prize at a second location in the transport system, said second location being different from the first location; and a control unit configured to receive a first detection result from the first detection module and a second detection result from the second detection module, and to control the amusement machine in function of the first and/or second detection result, wherein the control unit comprises an award module configured for awarding a number of prize points to the player if the control unit has received a first detection result indicating the detection of a prize and a second detection result indicating the detection of the same prize.

4. The amusement machine of claim 2, wherein the first detection module is arranged to detect a prize between the edge of the playing surface and the prize collecting location or at the prize collecting location, and wherein the second detection module is arranged to detect a prize between the prize infeed location and the playing surface.

5. The amusement machine of claim 2, wherein the first detection module is arranged to detect a prize at a first location between the edge of the playing surface and the prize collecting location and wherein the second detection module is arranged to detect a prize at a second location downstream of the first location.

6. The amusement machine of claim 5, wherein the second detection module is arranged to detect a prize between the edge of the playing surface and the prize collecting location or at the prize collecting location; or wherein the second detection module is located in the prize transport mechanism.

7. The amusement machine of claim 2, further comprising a sorting and discharge mechanism configured for sorting and discharging one or more prizes and playing pieces which have dropped over the edge to the prize collecting location and a playing piece collecting location, respectively.

8. The amusement machine of claim 7, wherein the first detection module is configured to detect a prize in a discharge channel between the sorting and discharge mechanism and the prize collecting location.

9. The amusement machine of claim 1, wherein the control unit is configured for controlling the transport system in function of first and/or second detection results of the first and/or second detection module, and in particular in function of a number of prizes detected by the first and/or second detection module, optionally further in function of a player input.

10. The amusement machine of claim 2, wherein a guide is provided between the prize infeed location and the playing surface, which guide is configured to guide the one or more prizes from the prize infeed location to the playing surface, wherein the second detection module is configured to detect a prize on the guide.

11. The amusement machine of claim 10, further comprising a barrier means configured to be in a closed or open position, and arranged along the guide to stop the movement of a prize on the guide in the closed position and to allow a prize to pass through in the open position, wherein the control unit is configured to control the barrier means based on any one or more of a detection result by the first and/or second detection module, a player input, a state of the game, a state of the transport mechanism.

12. The amusement machine of claim 2, further comprising a barrier means configured to be in a closed or open position, and arranged upstream of the prize collecting location to stop the movement of a prize in the closed position and to allow a prize to pass through in the open position, wherein the control unit is configured to control the barrier means based on any one or more of a detection result by the first and/or second detection module, a player input, a state of the game, a state of the transport mechanism.

13. The amusement machine of claim 10, wherein the guide is an inclining surface.

14. The amusement machine of claim 2, wherein the prize transport mechanism comprises at least one of a lift module and an Archimedes screw.

15. The amusement machine of claim 1, wherein the one or more prizes have a shape and/or size differing from the shape and/or size of a playing piece of the plurality of playing pieces; and/or wherein the prizes are at least two times larger than the playing pieces, and/or wherein the number of playing pieces is at least 10 times greater than the number of prizes, more preferably at least 100 times greater; and/or wherein the transport system is configured to circulate the one or more prizes in a closed loop; and/or herein the transport system is configured to circulate the plurality of playing pieces in a closed loop;

wherein optionally the closed loop for the one or more prizes is different from the closed loop for the plurality of playing pieces.

16. The amusement machine of claim 2, wherein the prize transport mechanism comprises a prize lift module and drive means for moving the prize lift module vertically upward from the prize collecting location to the prize infeed location and back, and wherein the control unit is configured for controlling the drive means in accordance with one or more of the following: a state of the game, a detection result, a player input.

17. The amusement machine of claim 1, wherein the transport system further comprises a playing piece collecting location configured to collect playing pieces, a playing piece infeed location configured for infeed of playing pieces, and a playing piece transport mechanism configured to transport the playing pieces collected in the playing piece collecting location to the playing piece infeed location;

said amusement machine further comprising a sorting and discharge mechanism configured for sorting and discharging the one or more prizes and playing pieces which have dropped over the edge to the prize collecting location and the playing piece collecting location, respectively;

wherein preferably the playing piece transport mechanism comprises a hopper module configured to move the playing pieces upward in an orderly row;

wherein optionally the playing piece transport mechanism comprises at least one of a swing arm, said swing arm being configured to move over the playing surface, and to guide the playing pieces through the swing arm to an outlet of the swing arm, which outlet is located above the playing surface, and a chute, said chute being configured to guide the playing pieces, preferably marbles, to an outlet of the chute, which outlet is near the playing surface or near a guide leading to the playing surface.

18. An amusement machine of the pusher type, comprising:

a playing surface on which a plurality of playing pieces, such as coins, chips or marbles, as well as one or more prizes are supported, a playing piece pusher configured to move over the playing surface at successive points in time in order to disturb the plurality of playing pieces and one or more prizes supported on the playing surface, and such that one or more playing pieces and/or prizes can drop over an edge of the playing surface during movement of the playing piece pusher;

a transport system configured to transport a prize which has dropped over an edge;

a first detection module configured to detect a prize which has dropped over the edge, at a first location in the transport system, a second detection module configured to detect the prize at a second location in the transport system, said second location being different from the first location; and a control unit configured to receive a first detection result from the first detection module and a second detection result from the second detection module, and to control the amusement machine in function of the first and/or second detection result;

wherein the transport system comprises: a prize collecting location configured to collect at least one or more prizes which have dropped over the edge, a prize infeed location configured for infeed of one or more prizes on the playing surface, and a prize transport mechanism configured to transport one or more prizes collected in the prize collecting location to the prize infeed location, wherein the amusement machine is a multiplayer with a plurality of playing surfaces, including the stated playing surface, which plurality of playing surfaces are arranged around a central zone, wherein the prize collecting location and the prize infeed location lie one above the other in the central zone.

* * * * *